US011740891B2

(12) United States Patent
Lopyrev et al.

(10) Patent No.: US 11,740,891 B2
(45) Date of Patent: *Aug. 29, 2023

(54) PROVIDING ACCESS TO A HYBRID APPLICATION OFFLINE

(71) Applicant: Dropbox, Inc., San Francisco, CA (US)

(72) Inventors: Anton Lopyrev, San Francisco, CA (US); Prabhdeep Gill, San Francisco, CA (US); Ashok Raju, San Francisco, CA (US); Ian Mendiola, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,436

(22) Filed: Nov. 23, 2021

(65) Prior Publication Data
US 2022/0100494 A1     Mar. 31, 2022

Related U.S. Application Data

(63) Continuation of application No. 16/914,891, filed on Jun. 29, 2020, now Pat. No. 11,200,044, which is a
(Continued)

(51) Int. Cl.
*G06F 8/65*     (2018.01)
*G06F 8/656*     (2018.01)
(Continued)

(52) U.S. Cl.
CPC ............... *G06F 8/65* (2013.01); *G06F 8/656* (2018.02); *G06F 9/445* (2013.01); *G06F 9/451* (2018.02);
(Continued)

(58) Field of Classification Search
CPC . G06F 8/65; G06F 8/656; G06F 8/658; H04L 2463/121
See application file for complete search history.

(56) References Cited

U.S. PATENT DOCUMENTS 7,309,260 B2    12/2007    Brower et al.
8,595,752 B1    11/2013    Fioravanti et al.
(Continued)

FOREIGN PATENT DOCUMENTS

JP     2007206757 A     8/2007
JP     2010508581 A     3/2010
(Continued)

OTHER PUBLICATIONS

D. Sin, E. Lawson and K. Kannoorpatti, "Mobile Web Apps—The Non-programmer's Alternative to Native Applications," 2012 5th International Conference on Human System Interactions, Perth, WA, Australia, 2012, pp. 8-15, doi: 10.1109/HSI.2012.11. (Year: 2012).*

(Continued)

*Primary Examiner* — Zhanh Thi-Minh Bui
(74) *Attorney, Agent, or Firm* — DLA PIPER LLP (US)

(57) ABSTRACT

Disclosed are systems, methods, and non-transitory computer-readable storage media for providing access to a hybrid web application offline. In some implementations, a computing device can be configured with a hybrid application that includes a native layer and a web view. The native layer can provide access to native features of the computing device while the web view can provide web client features, such as graphical user interfaces and server communication functionality. When the computing device is offline and the hybrid application is invoked, the native layer can load from local storage a resource bundle including the web code needed to present the web view graphical user interface, and/or facilitate communication with the web server. Similarly, when the computing device is offline, the hybrid application can load previously stored content items into the web view from local storage through the native layer so that the user can work with the content items offline.

13 Claims, 10 Drawing Sheets

Related U.S. Application Data continuation of application No. 16/269,048, filed on Feb. 6, 2019, now Pat. No. 10,740,087, which is a continuation of application No. 15/339,903, filed on Oct. 31, 2016, now Pat. No. 10,365,916.

(60) Provisional application No. 62/324,832, filed on Apr. 19, 2016.

(51) Int. Cl.

| | | |
|---|---|---|
| *G06F 9/451* | (2018.01) | |
| *G06F 9/455* | (2018.01) | |
| *G06F 9/445* | (2018.01) | |
| *G06F 9/54* | (2006.01) | |
| *H04L 67/02* | (2022.01) | |
| *H04L 67/1097* | (2022.01) | |
| *H04L 67/00* | (2022.01) | |
| *H04L 47/80* | (2022.01) | |
| *G06F 3/04842* | (2022.01) | |

(52) U.S. Cl.
CPC ............ *G06F 9/45504* (2013.01); *G06F 9/54* (2013.01); *G06F 9/546* (2013.01); *H04L 47/803* (2013.01); *H04L 67/02* (2013.01); *H04L 67/1097* (2013.01); *H04L 67/34* (2013.01); *G06F 3/04842* (2013.01)

(56) References Cited

U.S. PATENT DOCUMENTS

| | | | |
|---|---|---|---|
| 8,656,265 B1 | 2/2014 | Paulin et al. | |
| 8,959,492 B2 | 2/2015 | Detwiler et al. | |
| 9,161,156 B2* | 10/2015 | Mall ..................... | G06F 8/71 |
| 9,215,189 B1 | 12/2015 | Fioravanti et al. | |
| 9,489,190 B1* | 11/2016 | Wang .................... | G06F 8/65 |
| 10,365,436 B2 | 7/2019 | Byrd et al. | |
| 2007/0204011 A1 | 8/2007 | Shaver et al. | |
| 2011/0060991 A1 | 3/2011 | Grant et al. | |
| 2011/0138208 A1 | 6/2011 | Lee et al. | |
| 2012/0167063 A1 | 6/2012 | Detwiler et al. | |
| 2014/0047517 A1* | 2/2014 | Ding .................. | H04L 12/1453 726/5 |
| 2014/0068560 A1 | 3/2014 | Eksten et al. | |
| 2014/0095589 A1 | 4/2014 | Johnson et al. | |
| 2014/0109115 A1* | 4/2014 | Low ....................... | G06F 9/54 719/328 |
| 2014/0136945 A1 | 5/2014 | Ligman et al. | |
| 2014/0201328 A1 | 7/2014 | Zhao et al. | |
| 2014/0289360 A1 | 9/2014 | Mahkovec et al. | |
| 2014/0325470 A1* | 10/2014 | Padmavilasom ..... | H04L 67/565 717/100 |
| 2015/0281353 A1 | 10/2015 | Mahkovec et al. | |
| 2016/0048388 A1 | 2/2016 | Eksten et al. | |
| 2016/0164993 A1 | 6/2016 | Aizenberg et al. | |
| 2016/0164994 A1 | 6/2016 | Aizenberg et al. | |
| 2016/0253171 A1 | 9/2016 | Zang et al. | |
| 2016/0266889 A1 | 9/2016 | Gross et al. | |
| 2017/0017672 A1 | 1/2017 | Fan et al. | |
| 2017/0078452 A1 | 3/2017 | Verrijt et al. | |
| 2017/0300315 A1 | 10/2017 | Lopyrev et al. | |

FOREIGN PATENT DOCUMENTS

| | | |
|---|---|---|
| JP | 2016518653 A | 6/2016 |
| KR | 20090073199 A | 7/2009 |

OTHER PUBLICATIONS

Communication pursuant to Article 94(3) EPC for European Application No. 17719110.3 dated Oct. 28, 2020, 6 pages.
Communication under Rule 71(3) EPC for European Application No. 17719418.0 dated Jan. 8, 2020, 7 pages.
Communication under Rule 71(3) EPC of Intention to Grant for European Application No. 17719110.3 dated Dec. 9, 2020, 7 pages.
Decision to Grant a Patent for Japanese Application No. 2018-545650 dated Oct. 25, 2019, 3 pages.
First Examination Report for Australian Application No. 2017253672 dated Jun. 1, 2021, 3 pages.
Notice of Acceptance for Australian Application No. 2017253672, dated Oct. 6, 2021, 3 pages.
Notice of Allowance from U.S. Appl. No. 16/269,048, dated May 20, 2020, 11 pages.
Notice of Allowance from U.S. Appl. No. 16/914,891, dated Oct. 5, 2021, 14 pages.
Notice of Reasons for Refusal for Japanese Application No. 2018-545641 dated Oct. 4, 2019, 5 pages.
Rudolph P., "Hybrid Mobile Apps: Providing a Native Experience With Web Technologies," Smashing Magazine, Oct. 21, 2014, retrieved from https://www.smashingmagazine.com/2014/10/providing-a-native-experience-with-web-technologies/, on Sep. 19, 2017, pp. 1-28.
Suleman H., et al., "Hybrid Online-Offline Digital Collections," ACM, 2010, pp. 421-425.

* cited by examiner

PROVIDING ACCESS TO A HYBRID APPLICATION OFFLINE

CROSS-REFERENCE TO RELATED APPLICATIONS

This application is a continuation of U.S. patent application Ser. No. 16/914,891, filed Jun. 29, 2020, which is a continuation of U.S. patent application Ser. No. 16/269,048, filed Feb. 6, 2019, now U.S. Pat. No. 10,740,087, issued Aug. 11, 2020, which is a continuation of U.S. patent application Ser. No. 15/339,903, filed Oct. 31, 2016, now U.S. Pat. No. 10,365,916, issued Jul. 30, 2019, which claims priority to U.S. Provisional Application No. 62/324,832, filed Apr. 19, 2016, which are incorporated by reference in their entireties.

BACKGROUND

Much of today's computer technology is built within websites accessible through web clients. For example, some websites and web clients provide for content creation, collaboration, and storage. However, purely web based systems have limitations. For example, in order for the user to use the web client to create new content items, the user's computing device must be online and connected to the content creation website. Moreover, web clients are limited with respect to interactions with the user's computing device. For example, web clients have limits on the types of interactions and/or amount of data that the web client can store on the user's computing device. However, writing native client side code that performs the same functions as the web client without the limitations would be a burdensome task. Thus, it would be beneficial to have a hybrid client application that can avoid the limitations of the web client while also being able to operate while the user's device is offline.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically updating a hybrid web application. In some implementations, a computing device can be configured with a hybrid application that includes a native layer and a web view. The native layer can provide access to native features of the computing device while the web view can provide web client features, such as graphical user interfaces and server communication functionality. When the hybrid application is invoked, the native layer can load a resource bundle from local storage. The resource bundle can include the web code needed to present the web view graphical user interface, manage application data, and/or facilitate communication with the web server. To update the hybrid application, the application can download an updated resource bundle from the web server and reload the web code from the resource bundle.

Disclosed are systems, methods, and non-transitory computer-readable storage media for providing access to a hybrid web application offline. In some implementations, a computing device can be configured with a hybrid application that includes a native layer and a web view. The native layer can provide access to native features of the computing device while the web view can provide web client features, such as graphical user interfaces and server communication functionality. When the computing device is offline and the hybrid application is invoked, the native layer can load from local storage a resource bundle including the web code needed to present the web view graphical user interface, and/or facilitate communication with the web server. Similarly, when the computing device is offline, the hybrid application can load previously stored content items into the web view from local storage through the native layer so that the user can work with the content items offline.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a self-updating hybrid mobile application that can be used even when the hosting mobile device is offline.

Figure 1:
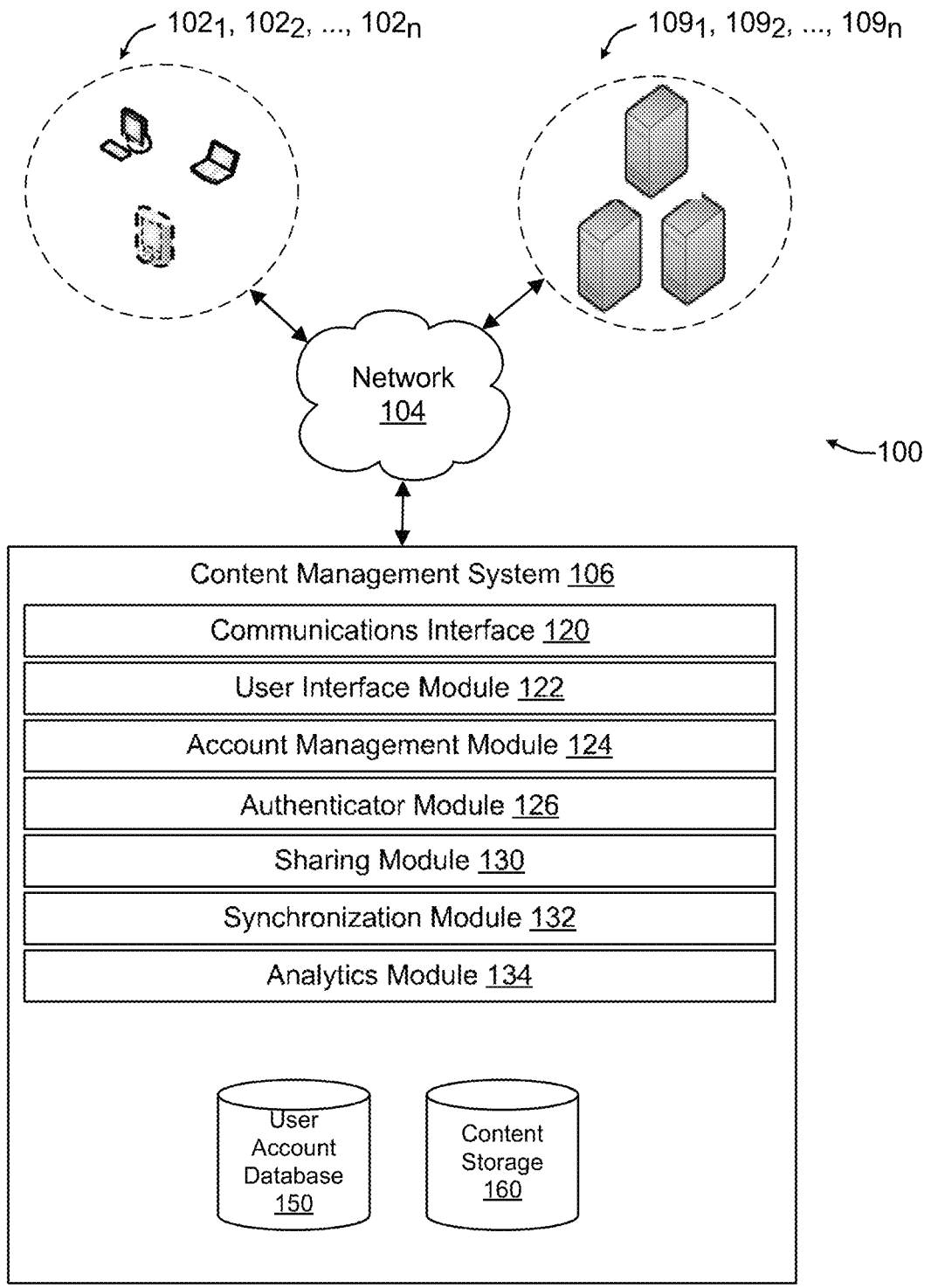
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device 102$_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
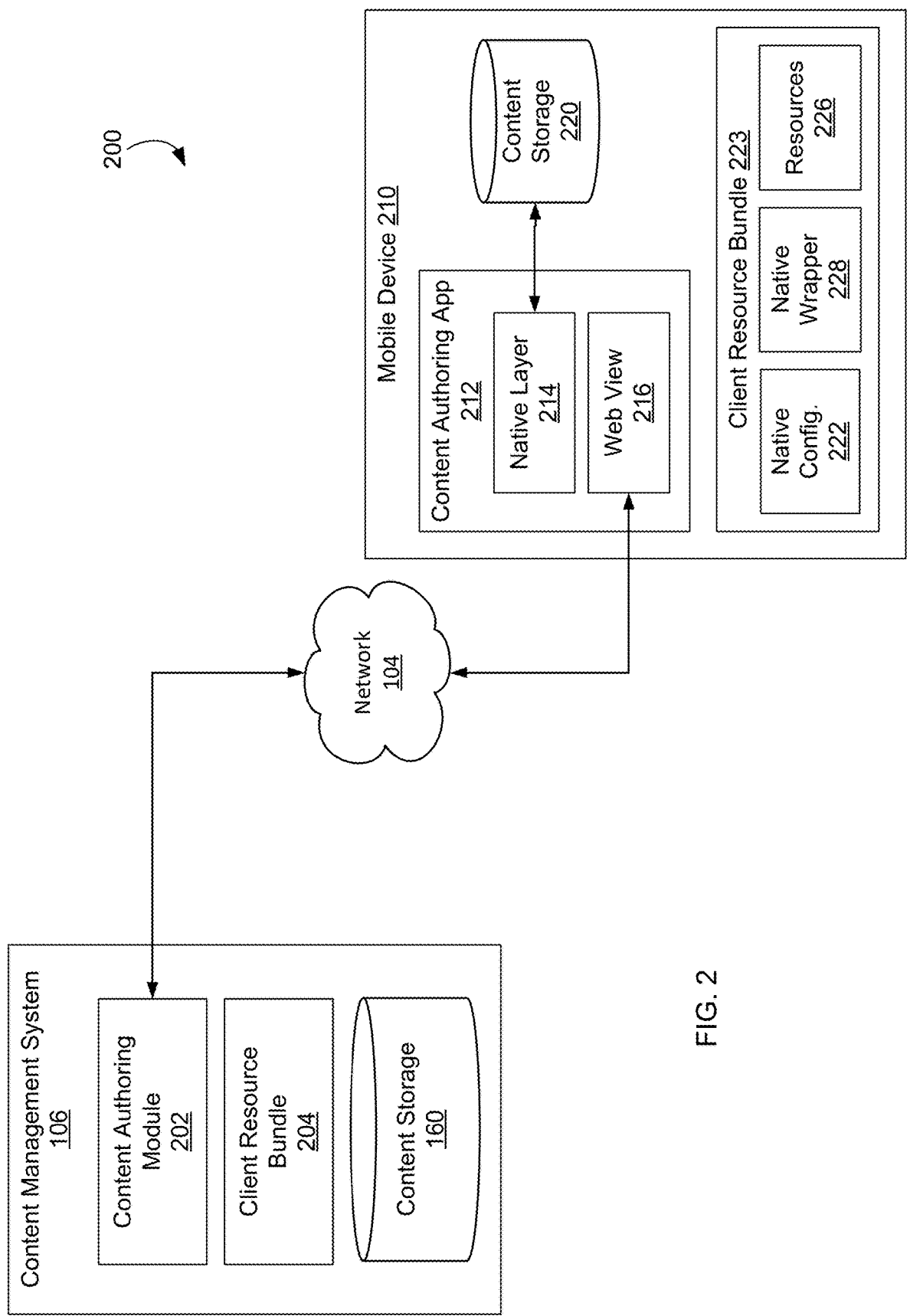
FIG. 2 is a block diagram of an example system for updating a hybrid application and providing access to a hybrid application offline.

FIG. 2 is a block diagram of an example system 200 for updating a hybrid application and providing access to a hybrid application offline. For example, system 200 can correspond to system 100 of FIG. 1. System 200 can include content management system 106, as described above.

In some implementations, content management system 106 can include content authoring module 202. For example, content authoring module 202 can provide features for creating content items and/or collaborating on content items. A user of system 200 can, for example, use a web browser to access content authoring module 202. Content authoring module 202 can deliver client resource bundle 204 to the web browser on the user's device. Client resource bundle 204 can include web code (e.g., HTML, JavaScript, etc.) for presenting a client interface of content authoring module 202. For example, client resource bundle 204 can include web code that causes the browser to present a text editing graphical user interface (e.g., a word processor) that the user can interact with to view and/or edit a textual content item. After the user creates or edits a content item using content authoring module 202, content authoring module 202 can store the created or edited content item in content storage 160. After the content item is stored in content storage 160, the content item can be synchronized between user devices, shared with other users and/or managed by content management system 106 similarly to other content items, as described above with reference to FIG. 1.

In some implementations, system 200 can include mobile device 210. For example, mobile device 210 can correspond to client device 102$_i$ of FIG. 1. In some implementations, mobile device 210 can include content authoring application 212. For example, instead of using a browser based web client to access content authoring module 202, as described above, the user of mobile device 210 can download and install content authoring application 212 on mobile device 210 to access the features and/or functionality provided by content authoring module 202.

In some implementations, content authoring application 212 can be a hybrid mobile application. For example, content authoring application 212 can include native layer 214. Native layer 214 can be an executable object compiled for execution on a particular computing platform. For example, native layer 214 can be compiled or built for execution on mobile device 210 (e.g., built for the operating system, processor, chipset, etc.) or devices having a similar configuration as mobile device 210. Because native layer 214 is built to run on mobile device 210, native layer 214 can have access to system functions and features of mobile device 210 that a browser based client does not while also performing better than non-native software. For example, while a browser based client of content authoring module 202 may be restricted as to which native or system functions the browser based client can access or the size of files that the browser based client can store, native layer 214 does not have those same restrictions because the native layer is built to interact natively with the operating system of mobile device 210 to access the system functions of mobile device 210.

In some implementations, content authoring application 212 can include web view 216. For example, web view 216 can be a web browser that is bundled inside of native layer 214. Native layer 214 can, for example, be a container for web view 216. Thus, web view 2016 can read, interpret, compile, and/or execute web code and/or technologies, such as HTML, JavaScript, cascading style sheets, etc., to generate graphical user interfaces, communicate with web servers, and perform other web client functions. The specific functionality of web view 216 depends on the web code loaded by web view 216.

Continuing the content authoring example above, a user of mobile device 210 can invoke content authoring application 212 to create, edit, collaborate on, or otherwise interact with content items. For example, when content authoring application 212 is invoked on mobile device 210, the code in native layer 214 can be executed.

Upon invocation of content authoring application 212, native layer 214 can load client resource bundle 223. For example, instead of downloading client resource bundle 204 from content management system 106 each time the user invokes content authoring application 212, content authoring application 212 can download and store a local copy of client resource bundle 204 (e.g., local client resource bundle 223). For example, client resource bundle 223 can be downloaded and stored on mobile device when content authoring application 212 is initially downloaded and installed on mobile device 212. Subsequently, content authoring application 212 can automatically download and store updates to client resource bundle 223 when updates are available from content management system 106, as described further below. Storing a local copy of client resource bundle 223 can, for example, facilitate offline use of content authoring application 212, as described further below.

In some implementations, client resource bundle 223 can include native configuration 222. For example, native configuration 222 can identify the current version of content authoring application 212 installed on mobile device 210. Native configuration 222 can include a URL for receiving new messages from the web code executed by web view 216 (described further below). Native configuration 222 can identify resources needed to run the identified version of content authoring application 212.

In some implementations, client resource bundle 223 can include resources 226. For example, resources 226 can include the files (e.g., web code files, JavaScript files, HTML files, images, icons, etc.) containing the computer instructions for executing web view 216. For example resources 226 can include the resources necessary for running the web client for content authoring module 202 in web view 216. For example, the web client run in web view 216 can be similar to the web client run in a web browser. However, instead of being executed within the web browser, the web client (or portions of the web client) can be run within native layer 214 of content authoring application 212 thereby allowing the web client access to native features, functions, application programming interfaces, etc., of mobile device 210.

In some implementations, client resource bundle 223 can include native wrapper 228. For example, native wrapper 228 can be an HTML file that is loaded into the web view 216 to boot up content authoring application 212. For example, upon invocation of content authoring application 212, native layer 214 can be executed. Native layer 214 can include instructions for executing web view 216. When web view 216 is executed by native layer 214, web view 216 can load native wrapper 228 (e.g., an HTML file) that includes instructions for loading resources 226 (e.g., JavaScript) from client resource bundle 228. Resources 226 can include instructions (e.g., JavaScript instructions, HTML instructions, CSS instructions, etc.) for presenting graphical user interfaces (e.g., a content editor interface), managing application data, and/or communicating with content authoring module 202 of content management system 106. Thus, web view 216 can present graphical user interfaces, manage application data, etc., even when mobile device 210 is offline and not connected to content authoring module 202.

In some implementations, mobile device 210 can include content storage 220. For example, to facilitate use of content authoring application 212 while mobile device 210 is offline and not connected to content authoring module 202 of content management system 106, content authoring application 212 can download authored content from content management system 106. For example, when connected to content authoring module 202 through network 104, content authoring application 212 can request from content authoring module 202 content items that have been created, edited, and/or managed by content authoring module 202. When the requested content items are received by content authoring application 212, content authoring application 212 can store the content items in content storage 220. Later, when content authoring application 212 is invoked while mobile device 210 is offline and not connected to content authoring module 202, content authoring application 212 can allow the user to view and/or interact with content items in content storage 220 using the content authoring interfaces provided by web view 216. Thus, content authoring application 212 can provide access to the web client interfaces and/or online content even when mobile device 210 is offline.

Figure 3:
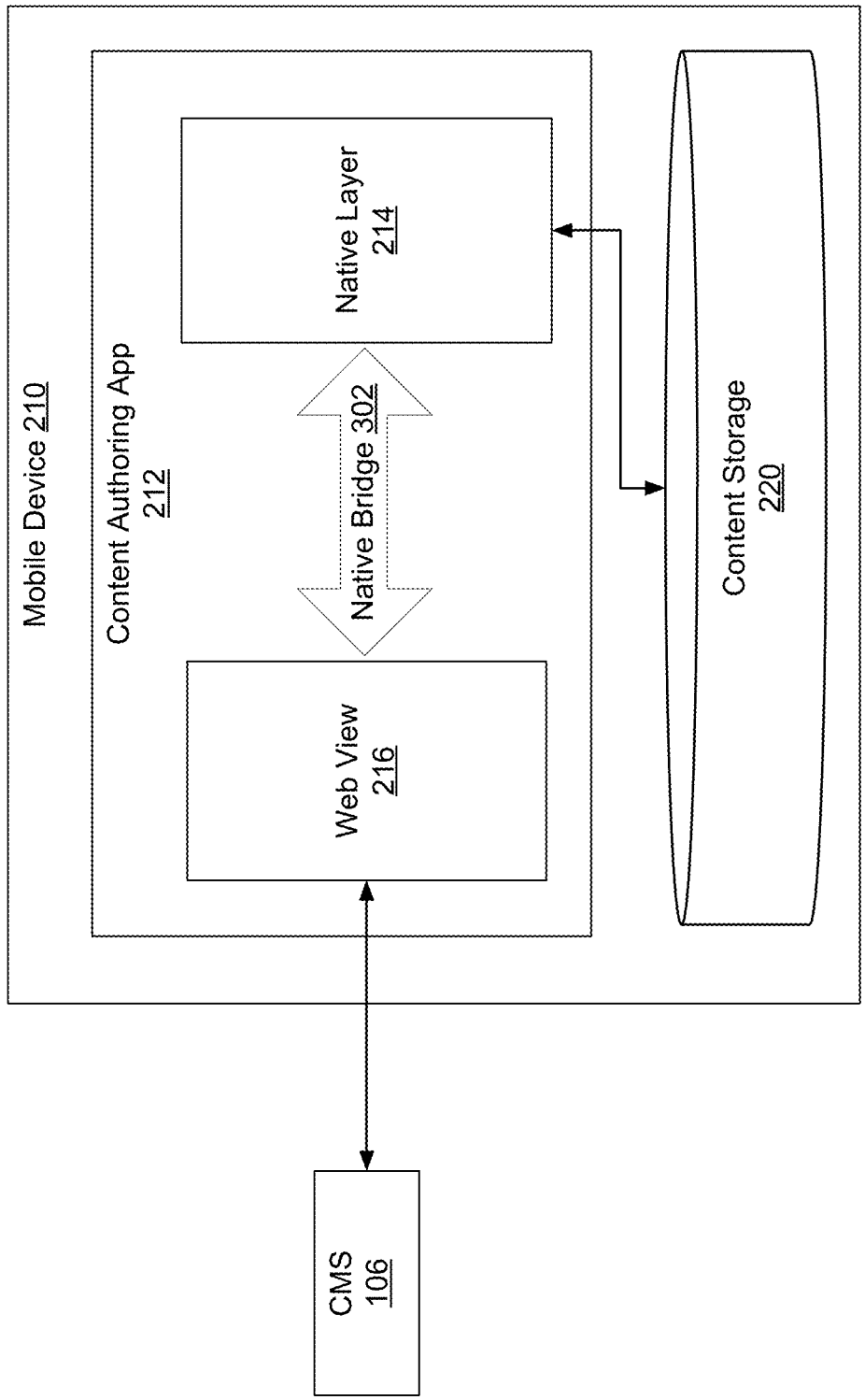
FIG. 3 is a block diagram of an example system that provides a native bridge between the native layer and web view of a hybrid application.

FIG. 3 is a block diagram of an example system 300 that provides a native bridge between the native layer and web view of a hybrid application. For example, native bridge 302 can include a global variable (e.g., "Bridge"), an empty iframe (e.g., HTML inline frame), and a native bridge protocol for conveying messages between native layer 214 and web view 216.

In some implementations, content authoring application 212 can use a global variable to send messages from native layer 214 to web view 216. For example, when web view 216 loads and executes the web code in client resource bundle 223, the web code (e.g., JavaScript) can create a global variable (e.g., "Bridge") for sending messages between native layer 214 to web view 216 (e.g., the web code running in the web view). Native layer 214 can, for example, send messages to web view 216 by generating a string encoded with the message to be sent to web view 216 and saving the string in the global variable (e.g., using a JavaScript function call). When native layer 214 stores the message in the global variable, web view 216 can be notified that the value of the global variable has changed. Web view 216 can then read the message and perform an operation in response to receiving the message.

In some implementations, content authoring application 212 can use an empty HTML iframe to send messages from web view 216 to native layer 214. For example, when web view 216 loads and executes the web code in client resource bundle 223, the web code (e.g., JavaScript) can create an empty iframe for notifying native layer 214 that a new message has been sent from web view 216. Web view 216 can, for example, send messages to native layer 214 by generating a string encoded with the message to be sent to native layer 214 and saving the string in the global variable (e.g., using a JavaScript function call). When web view 216 stores the message in the global variable, web view 216 can notify native layer 214 that the value of the global variable has changed by navigating the iframe to a predefined URL (e.g., "data://_QUEUE_MESSAGE_"). Native layer 214 can intercept the navigation to the predefined URL and interpret the navigation as a notice that a new message is available from web view 216. Native layer 214 can then read the message from the global variable (e.g., using a JavaScript function call) and perform an operation in response to receiving the message. Thus, although content authoring application 212 is built from heterogeneous layers implemented using different technologies (e.g., native layer 214 implemented in native code and web view 216 implemented in non-native web code), these different layers are able to achieve bidirectional communication using native bridge 302, as described above.

In some implementations, content authoring application 212 can be configured to use native layer 214 for system interfacing features and web view 216 (e.g., defined by web code in client resource bundle 223) for user and network interfacing features. For example, native layer 214 can be configured to perform local data storage and retrieval functions for content authoring application 212 using native APIs of mobile device 210. For example, when a user creates a new content item using the content authoring features of web view 216, web view 216 can send a message to native layer 216 through native bridge 302 to cause native layer 214 to store the newly created content item to client resource bundle 223. In some implementations, web view 216 can convert the content item to a string and send the string to native layer 214 for storage using native bridge 302, as described above. Thus, even if the size of the newly created content item exceeds the data storage size limitations imposed on web technologies, the new content item can be stored to local storage 220 because the data storage operation is being performed by native layer 214 using native APIs of mobile device 210.

In some implementations, web view 216 can be configured to manage user interfaces and communicate with content management system 106. For example, because web view 216 is implemented using various web technologies, such as JavaScript, HTML, cascading style sheets, etc., the user interfaces for content authoring application 212 are easier to create by developers. Moreover, since the web technologies are platform independent, the web code used by web view 216 can be written once (e.g., per version of the application) and used across a variety of computing platforms. Additionally, since the web code is provided using client resource bundle 223, software updates can be performed by simply replacing client resource bundle 223 and without reinstalling or updating native layer 214 of content authoring application 212. Thus, interactions between content authoring application 212 and mobile device 210 can be performed using efficient native interfaces, while core graphical user interfaces, the core application data model, and network communications can be performed using easy to use (and reuse) and easy to implement web technologies.

In some implementations, native bridge 302 can implement a native bridge protocol for handling a variety of message types. For example, while the data type of the messages exchanged between native layer 214 and web view 216 is a string, the string can be encoded with data describing specific message types and corresponding payloads. For example, the native bridge protocol can include a "get content item" message type for getting a content item by identifier and type. Web view 216 can, for example, generate a message string that identifies the message type (e.g., "getItem"), specifies an identifier for the content item (e.g., "contentItem1", string identifier, URL, etc.), and specifies a type for the content item (e.g., "note"). For example, the message string can look like the following: "getItem: contentItem1, note." Web view 216 can store the string in the global variable (e.g., "Bridge") and navigate the empty iframe to the predefined URL (e.g., "data://__QUEUE_MESSAGE_") to notify native layer 214 that a new message has been sent by web view 216 (e.g., sent by the web technology running in web view 216).

In some implementations, native layer 214 can intercept the navigation of the empty iframe to the predefined URL and retrieve the message from the global variable in response to the navigation. Native layer 214 can parse the message string to determine the operation requested by web view 216. For example, native layer 214 can parse the string to determine that web view 216 is requesting that native layer 214 get a content item associated with the specified identifier and/or content item type. Native layer 214 can retrieve the content item matching the specified identifier and/or content item type from local content storage 220. Native layer 214 can encode the content item into a message string that identifies the content item and includes the content of the content item (e.g., "contentItem1: content"). Native layer 214 can store the message string in the global variable, as described above. After native layer 214 stores the message string in the global variable, web view 216 can receive a notification that the value of the global variable has changed. Web view 216 can obtain the message string from the global variable and parse the message string to obtain the requested content item.

Similarly, native bridge 302 can provide for getting all items of a specified content item type. For example, web view 216 can send a message (e.g., "getAllItems: type") to native layer 214 to get all content items corresponding to a specified content item type (e.g., "note"). Native layer 214 can find all content items in content storage 220 corresponding to the specified content item type and send the found content items to web view 216 using native bridge 302, as described above.

In some implementations, native bridge 302 can provide a mechanism that allows web view 216 to store content items to local content storage 220 using native layer 214. For example, the native bridge protocol can define messages for storing a content item to local content storage 220 and/or updating a content item in local content storage 220. The store and update messages can include a content item identifier, a content item type, and a value. The value can include the content of the identified content item to be stored or updated. These messages can be encoded into message strings, as described above. For example, to store a new content item, web view 216 can generate a string that includes the message type, the content item identifier, the content item type, and the content value (e.g., "setItem: contentItem2, note, content"). To store an update to a content item, web view 216 can generate a string that includes the message type, the content item identifier, the content item type, and the content value (e.g., "updateItem: contentItem2, note, content"). Web view 216 can send the message string to native layer 214 using the native bridge protocol described above. Upon receipt of the message from web view 216, native layer 214 can perform the requested storage or update operation to store or update the specified content item in content storage 220 based on content parsed from the received message.

In some implementations, native bridge 302 can provide a mechanism that allows web view 216 to delete content items from local content storage 220 using native layer 214. For example, the native bridge protocol can define messages for deleting a content item from local content storage 220 (e.g., "removeItem") and/or deleting all content items from local content storage 220 (e.g., "clear"). The remove item message can include a content item identifier and/or a content item type. The clear message has no parameters. In response to receiving a message string from web view 216 indicating that web view 216 is requesting deletion of a content item (e.g., "removeItem: contentItem3, note"), native layer 214 can delete the specified content item from local content storage 220. In response to receiving a message string from web view 216 indicating that web view 216 is requesting deletion of all content items (e.g., "clear"), native layer 214 can delete the all content items from local content storage 220. Thus, native bridge 302 can implement protocols for communicating between web view 216 and native layer 214 so that the web technologies of web view 216 can take advantage of native API access available to native layer 214.

Figure 4:
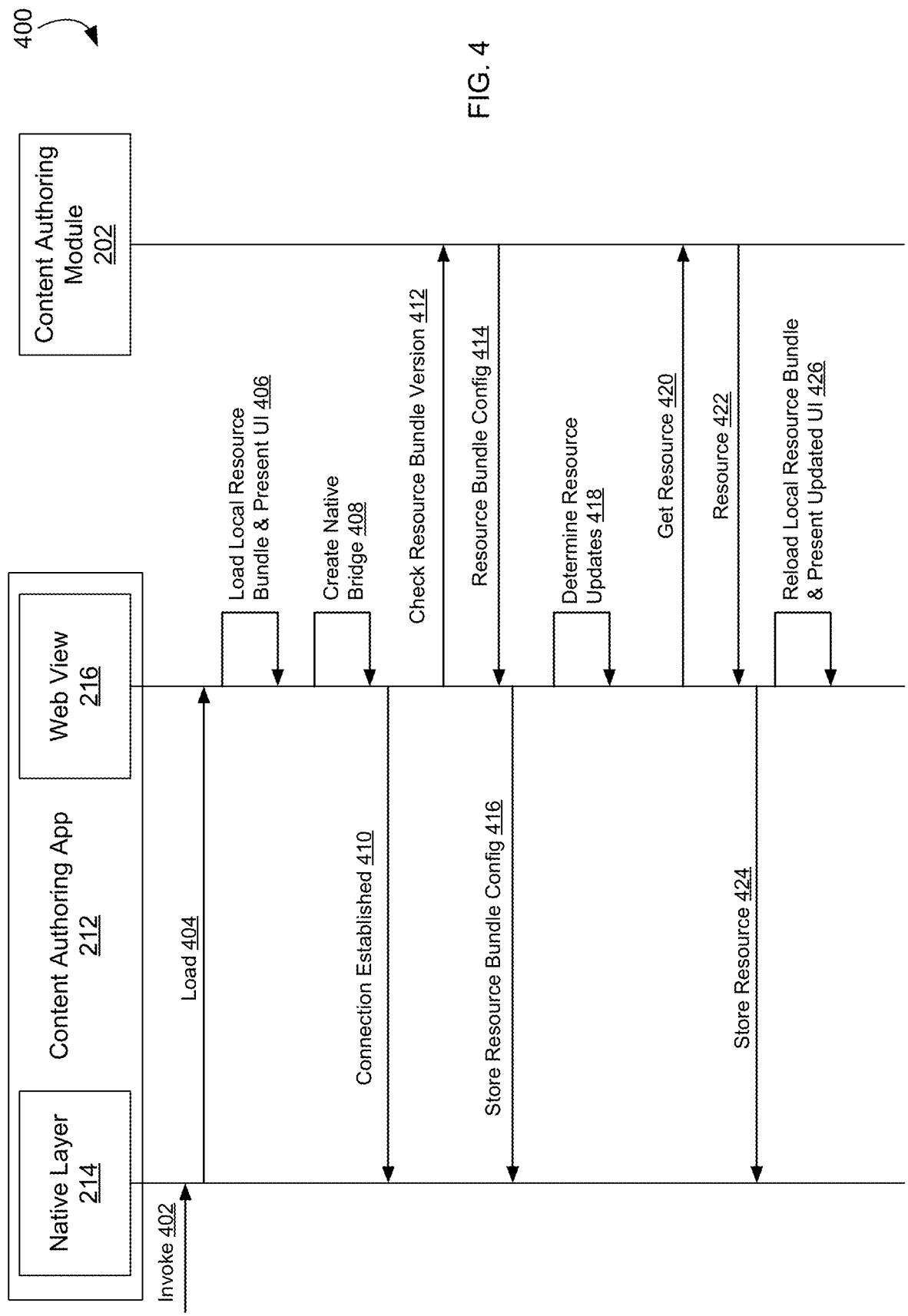
FIG. 4 is a component interaction diagram illustrating an example process for updating a hybrid application.

FIG. 4 is a component interaction diagram illustrating an example process 400 for updating a hybrid application. For example, a user can invoke (402) content authoring application 212. Upon invocation of content authoring application 402, native layer 214 can load (404) web view 216. For example, web view 216 can be a JavaScript engine, web browser, etc., contained within content authoring application 212 and/or within native layer 214. The functionality provided by web view 216 is defined by web code (e.g., JavaScript, HTML, CSS, etc.) that is loaded into web view 216. For example, web view 216 can load (406) local client resource bundle 223 using native wrapper 228 and execute web code to present a graphical user interface and/or provide other functionality as defined by resources 226 (e.g., JavaScript files, HTML files, etc.).

After loading the local resource bundle, web view 216 can create (408) the native bridge to facilitate communication between web view 216 and native layer 214. For example, resources 226 can include web code (e.g., JavaScript) that creates a global variable for communicating between web view 216 and native layer 214. The web code can create the iframe that is used by web view 216 to notify native layer 214 that a new message is available from web view 216. After the bundle is loaded and the native bridge is created, web view 216 can use the native bridge to send (410) a connection established message to native layer 214 indicating that web view 216 has been successfully initiated and that the native bridge is operational.

In some implementations, web view 216 can determine whether a software update is available for web view 216. For example, web view 216 can send a message (412) to content authoring module 202 of content management system 106 to request version update information. For example, the request can be a specific request for current version information. The request can be part of another request for information. For example, web view 216 can request a content item from content authoring module 202. The header of the content item request can include information identifying the version of content authoring application 212 installed on mobile device 210. When web view 216 loads client resource bundle 223, web view 216 can obtain the version information for local client resource bundle 223 from native configuration 222. Web view 216 can send the version information (e.g., version identifier) for local client resource bundle 223 to content authoring module 202. Content authoring module 202 can determine whether the version of local client resource bundle 223 matches (e.g., corresponds to, is the same as, etc.) the current version of resource bundle 204 on content management system 106. When the versions match (e.g., local client resource bundle 223 corresponds to the latest version of resource bundle 204), content authoring module 202 can send a message to web view 216 indicating that local client resource bundle 223 is the most up to date version available.

When the versions do not match (e.g., local client resource bundle 223 is out of date), content authoring module 202 can send a message (414) to web view 216 that includes the native configuration file for client resource bundle 204. As described above, the native configuration file can include a version identifier for the updated version of content authoring application 210, and a list of resources for the updated version of content authoring application 210. In some implementations, the list of resources can include for each resource a resource identifier (e.g., name, URL, etc.) and/or a timestamp corresponding to the last update to the resource. After receiving the updated native configuration file, web view 216 can request (e.g., through native bridge 302) that native layer 214 store (416) the native configuration file to local storage on mobile device 210.

In some implementations, web view 216 can determine (418) which individual resources in client resource bundle 223 on mobile device 210 should be updated. For example, after receiving the updated native configuration file from content authoring module 202, web view 216 can compare the updated native configuration file to local native configuration file 222 to determine which resources have been changed. For example, web view 216 can compare the respective timestamps of each resource to determine whether the timestamps differ between the updated native configuration file and local native configuration file 222. When web view 216 identifies a resource where the timestamp in local native configuration file 222 differs from the updated native configuration file or when web view 216 identifies a resource in the updated native configuration file that does not exist in local native configuration file 222, then web view 216 can request (420) the identified resource from content authoring module 202. For example, web view 216 can make multiple requests for updated or new resources depending on how many resource updates are identified in the updated native configuration file. Updating resources individually rather than updating the entire client resource bundle provides for more efficient use of bandwidth (e.g., only changed files are transmitted) and allows for resuming the update if the network connection is interrupted.

In some implementations, web view 216 can receive (422) the updated resource from content authoring module 202. For example, web view 216 can receive an updated resource in response to each resource request. After receiving a resource update (e.g., after each resource is received or after all resources are received), web view 216 can request (e.g., through native bridge 302) that native layer 214 store each resource in local storage on mobile device 210.

In some implementations, web view 216 can dynamically update web view 216 with the updated resources while web view 216 is running. For example, after storing the updated resources (e.g., now local client resource bundle 223) to local storage, web view 216 can reload local client resource bundle 223 to load the updated resources and execute the updated web code. For example, web view 216 can reload client resource bundle 223 when performing a navigation operation (e.g., to a new web page, URL, etc.) so that the transition appears seamless to the user. After loading the updated resource, web view 216 can, for example, present an updated graphical user interface having new functionality for the user to use. Thus, content authoring application 212 can be updated while continuing to run and without needing to update the native code in native layer 214. Moreover, by storing client resource bundle 223 locally on mobile device 210, client authoring application 212 can be used by the user even when mobile device 210 is offline.

Figure 5:
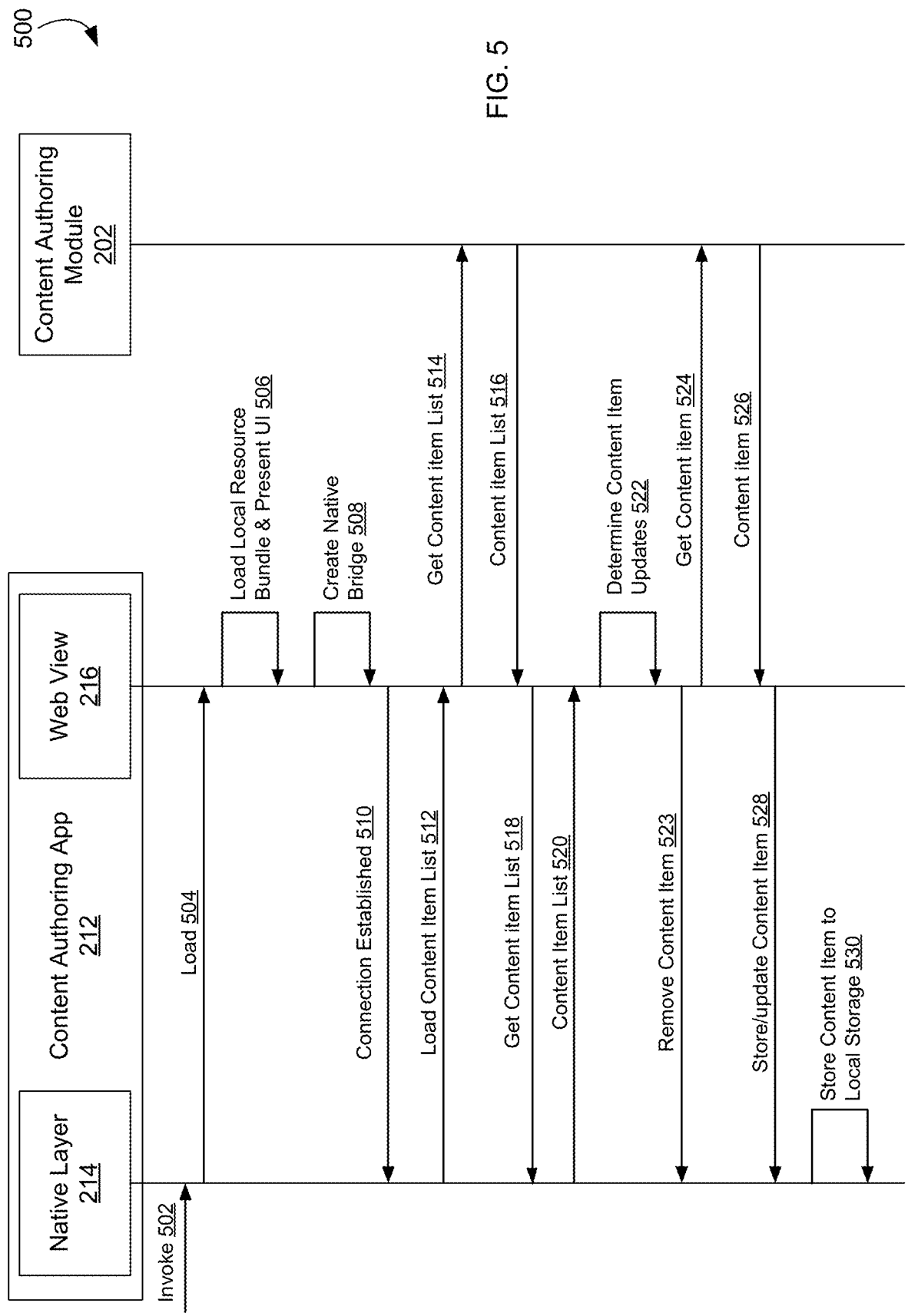
FIG. 5 is a component interaction diagram illustrating an example process for native file storage in hybrid application.

FIG. 5 is a component interaction diagram illustrating an example process 500 for native file storage in a hybrid application. For example, a user can invoke (502) content authoring application 212. Upon invocation of content authoring application 402, native layer 214 can load (504) web view 216. For example, web view 216 can be a JavaScript engine, web browser, etc., contained within content authoring application 212 and/or within native layer 214. The functionality provided by web view 216 is defined by web code (e.g., JavaScript, HTML, CSS, etc.) that is loaded into web view 216. For example, web view 216 can load (506) local client resource bundle 223 using native wrapper 228 and execute web code to present a graphical user interface and/or provide other functionality as defined by resources 226 (e.g., JavaScript files, HTML files, etc.).

After loading the local resource bundle, web view 216 can create (508) the native bridge to facilitate communication between web view 216 and native layer 214. For example, resources 226 can include web code (e.g., JavaScript) that creates a global variable for communicating between web view 216 and native layer 214. The web code can create the iframe that is used by web view 216 to notify native layer 214 that a new message is available from web view 216. After the bundle is loaded and the native bridge is created, web view 216 can use the native bridge to send (510) a connection established message to native layer 214 indicating that web view 216 has been successfully initiated and that the native bridge is operational.

After web view 216 is running (e.g., as indicated by the connection established message), native layer 214 can send a message (512) to web view 216 (e.g. through the native bridge) to cause web view 216 to load a content item list. For example, the content item list can include content items created and/or managed by content authoring application 212. The content item list can be loaded as part of the initialization process of content authoring application 212 so that web view 216 can present the list to the user so that the user can select content items to edit using content authoring application 212. The content item list can be loaded so that web view 216 can update content items stored locally in content storage 220.

In response to receiving the load content item list message from native layer 214, web view 216 can request (514) the content item list from content authoring module 202 of content management system 106. In response (516), content authoring module 202 can send a list of content items associated with the user and available for editing with (e.g., compatible with) content authoring application 212.

In some implementations, web view 216 can update local content storage 220 with content items in the received content item list. For example, after web view receives the content item list from content authoring module 202, web view 216 can request (e.g., through the native bridge) a local content item list (518) from native layer 214. The local content item list can, for example, include a list of content items associated with content authoring application 212 and stored locally in content storage 220. Native layer 214 can generate the local content item list and send the content item list (520) to web view 216 through the native bridge.

After receiving the local content item list and the server content item list (e.g., from content authoring module 202), web view 216 can compare the two lists to determine (522) which content items have been added, modified, or deleted from content management system 106. For example, when the local content item list includes a particular content item and the server content item list does not, web view 216 can send a request (523) to native layer 214 to remove (e.g., delete) the particular content item.

When the local content item list does not include a particular content item that is included in the server content item list, web view 216 can send a message (524) to content authoring module 202 requesting the particular content item. Content authoring module 202 can respond by sending (526) the requested content item to web view 216. Similarly, when a timestamp for a particular content item in the local content item list does not match the corresponding content item in the server content item list, web view 216 can send a message (524) to content authoring module 202 requesting updates for the particular content item. Content authoring module 202 can respond by sending (526) the requested content item updates to web view 216. Web view 216 can, in turn, send a message (528) to native layer 214 through the native bridge to store or update the particular content item in local content storage 220. In response to receiving the message from web view 216, native layer 214 can store or update (530) the content item in local content storage 220. Thus, content authoring application 212 can keep the content items stored in local content storage 220 updated so that content authoring application 212 can provide for offline access to the content items associated with content authoring application 212.

Figure 6:
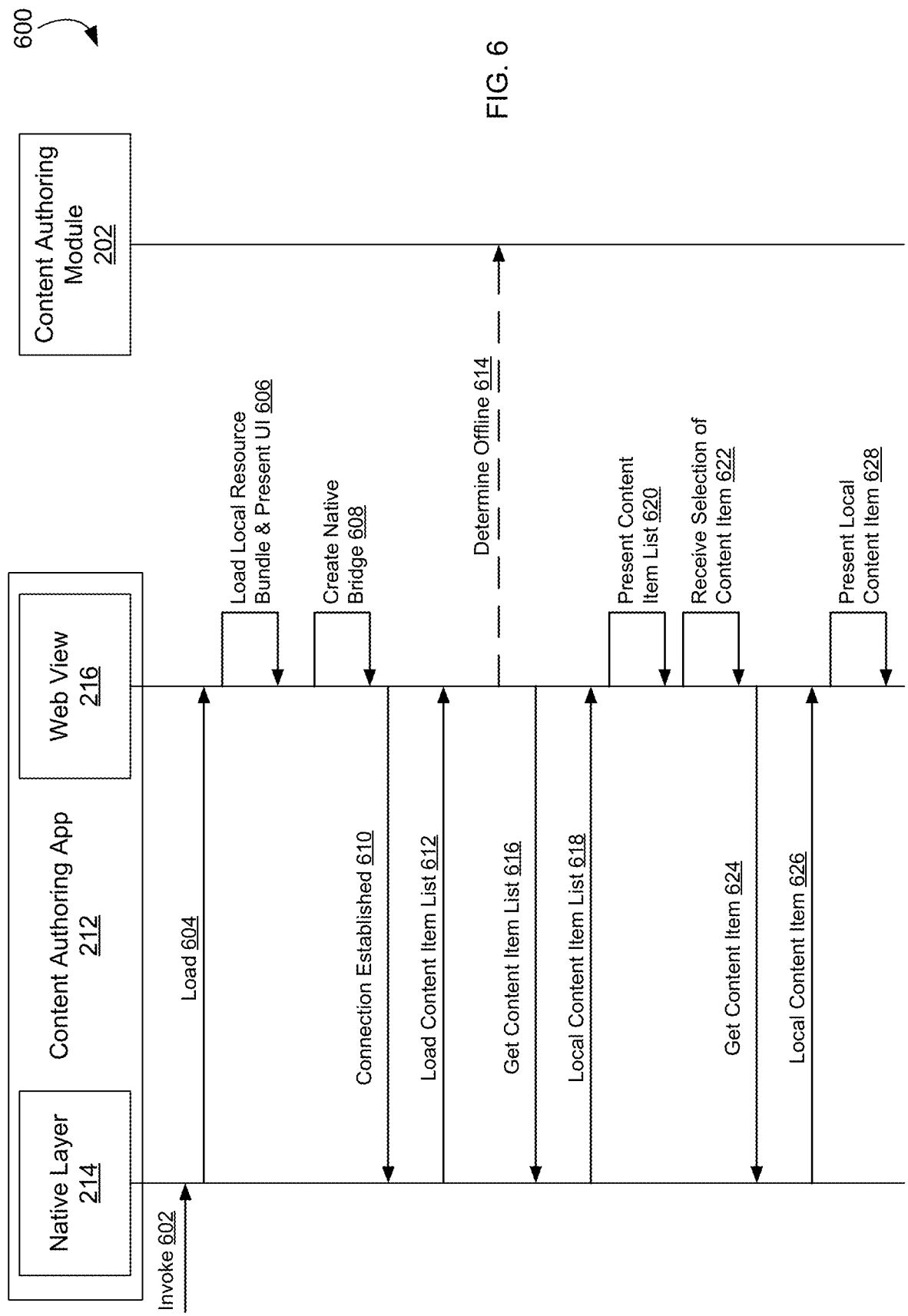
FIG. 6 is a component interaction diagram illustrating an example process for working offline in hybrid application.

FIG. 6 is a component interaction diagram illustrating an example process 600 for working offline in a hybrid application. For example, a user can invoke (602) content authoring application 212. Upon invocation of content authoring application 402, native layer 214 can load (604) web view 216. For example, web view 216 can be a JavaScript engine, web browser, etc., contained within content authoring application 212 and/or within native layer 214. The functionality provided by web view 216 is defined by web code (e.g., JavaScript, HTML, CSS, etc.) that is loaded into web view 216 from local client resource bundle 223. For example, web view 216 can load (606) local client resource bundle 223 using native wrapper 228 and execute web code to present a graphical user interface and/or provide other functionality as defined by resources 226 (e.g., JavaScript files, HTML files, etc.).

After loading the local resource bundle, web view 216 can create (608) the native bridge to facilitate communication between web view 216 and native layer 214. For example, resources 226 can include web code (e.g., JavaScript) that creates a global variable for communicating between web view 216 and native layer 214. The web code can create the iframe that is used by web view 216 to notify native layer 214 that a new message is available from web view 216. After the bundle is loaded and the native bridge is created, web view 216 can use the native bridge to send (610) a connection established message to native layer 214 indicating that web view 216 has been successfully initiated and that the native bridge is operational.

After web view 216 is running (e.g., as indicated by the connection established message), native layer 214 can send a message (512) to web view 216 (e.g., through the native bridge) to cause web view 216 to load a content item list. For example, the content item list can include content items created and/or managed by content authoring application 212. The content item list can be loaded as part of the initialization process of content authoring application 212 so that web view 216 can present the list to the user so that the user can select content items to edit using content authoring application 212. The content item list can be loaded so that web view 216 can update content items stored locally in content storage 220.

However, instead of requesting a content item list from content authoring module 202 as described in process 500, web view 216 can determine (614) that mobile device 210 is offline and/or content authoring module 202 is unreachable. In response to determining that content authoring module 202 is unreachable, web view 216 can send a message (616) through the native bridge to native layer 214 requesting that native layer 214 send web view 216 a local content item list identifying the content items stored locally in content store 220. Native layer 214 can generate a list of locally stored content items associated with content authoring application 212 and send the list to web view 216 through the native bridge. After receiving the local content item list, web view 216 can present the local content item list on a graphical user interface presented by web view 216 according to the instructions provided by resources 226 of client resource bundle 223 on mobile device 210.

In some implementations, web view 216 can present a local content item. For example, after presenting the list of local content items, web view 216 can receive a user selection of a content item from the list of local content items. In response to receiving the selection, web view 216 through local bridge 302 can request the selected content item from native layer 214. Native layer 214 can obtain the requested content item from local content storage 220 and send (626) the requested local content item to web view 216. After receiving the requested local content item, web view 216 can present (628) the local content item for review and/or editing by the user of content authoring application 212. Thus, even though mobile device 210 is offline and/or content authoring module 202 is unreachable, web view 216 can still present graphical user interfaces, present content items, and/or perform other operations because everything needed to execute (e.g., run, present, operate, etc.) web view 216 and present content items is stored locally on mobile device 210.

Figure 7:
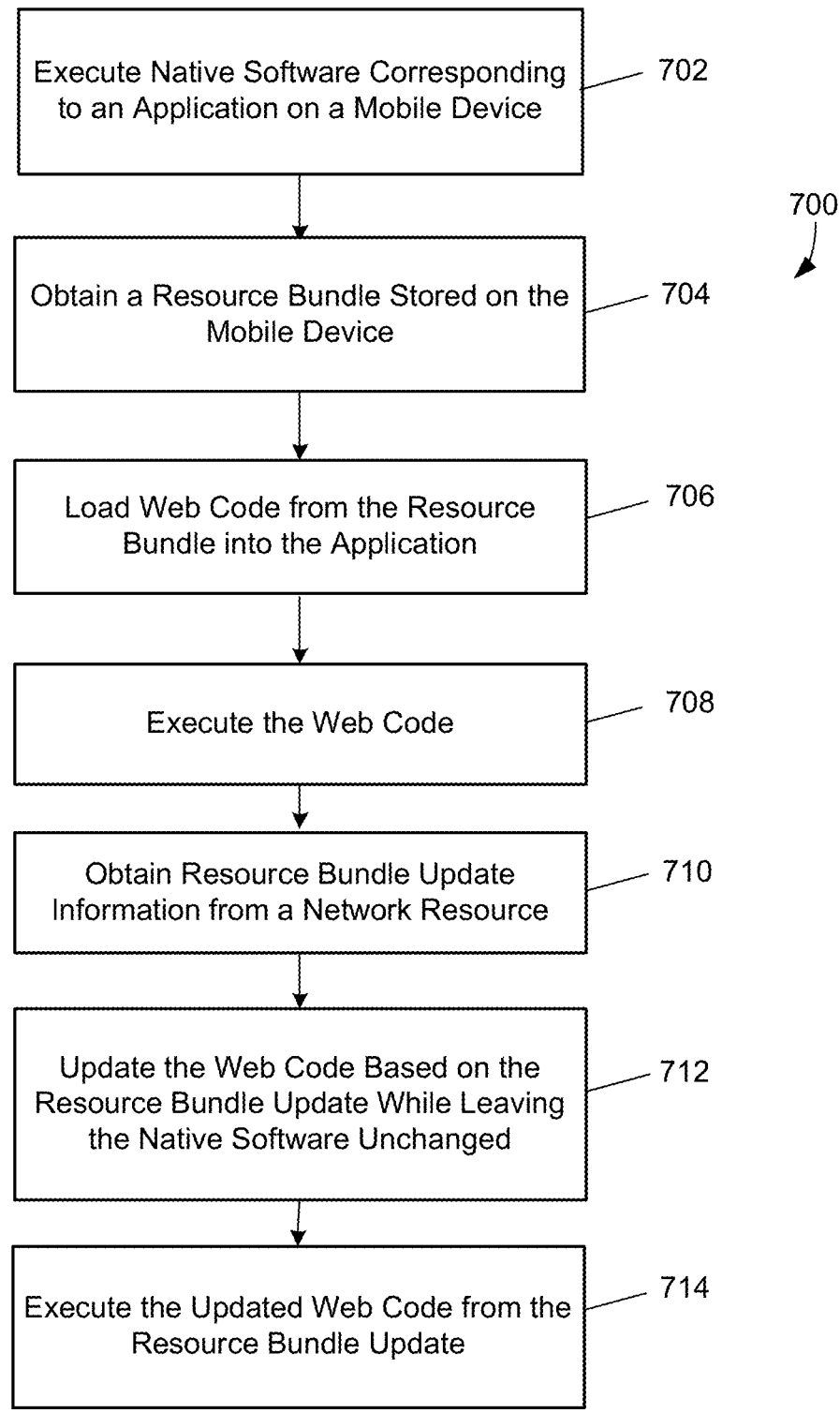
FIG. 7 is an example process for updating a hybrid application.

FIG. 7 is an example process 700 for updating a hybrid application. For example, process 700 can update the web code of the hybrid application while the hybrid application is running and without modifying the native code of the hybrid application.

At step 702, mobile device 210 can execute native software corresponding to a hybrid application installed on the mobile device. For example, the native software can correspond to native layer 214, described above. The native software can be platform-specific in that the software can be compiled and/or built for a specific operating system, processor, or system configuration used or implemented by mobile device 210.

At step 704, mobile device 210 can obtain a resource bundle for the hybrid application stored on mobile device 210. For example, when the hybrid application is installed on mobile device 210, the installation can include storing on mobile device 210 a resource bundle that includes the resources needed to execute a web view within the hybrid application.

At step 706, mobile device 210 can load web code from the resource bundle into the hybrid application. For example, the web code can include various platform independent web technologies, such as HTML, JavaScript, CSS, etc. The native software can include a web engine (e.g., web browser, JavaScript engine, compiler, interpreter, etc.) that can read, compile, and/or execute the web code. Mobile device 210 can load the web code from the resource bundle into the web engine when the hybrid application is initialized by loading a web page (e.g., a local native wrapper HTML file) that references the resources in the resource bundle.

At step 708, mobile device 210 can execute the web code. For example, the web engine in the native software can read, compile and/or execute the web code (e.g., web view 216) to present graphical user interfaces, manage and/or manipulate data, and communicate with web servers, such as content authoring module 202 of content management system 106.

At step 710, mobile device 210 can obtain resource bundle update information from a network resource. For example, when the hybrid application communicates with a corresponding web server, the hybrid application can send version information identifying the version of the hybrid application running on mobile device 210. When the web server receives the version information, the web server can determine whether the version of the hybrid application on mobile device 210 corresponds to the latest version of the hybrid application at the web server. When the version of the hybrid application on mobile device 210 does not match the latest version of the application on the web server, the web server can send an updated resource bundle to the hybrid application. For example, the web server can send configuration data identifying the latest version of the hybrid application and the resources corresponding to the latest version of the hybrid application.

At step 712, mobile device 210 can update the web code of the hybrid application based on the resource bundle update while leaving the native software unchanged. For example, the mobile device 210 can determine which resources in the resource bundle are out of date based on the configuration data. Mobile device 210 can then request the resources that are required to update the hybrid application, as described above. Mobile device 210 can replace the out of date resources in the local resource bundle stored on mobile device 210 with the newly updated resources.

At step 714, mobile device 210 can execute the updated web code from the updated resource bundle. For example, the web engine can reload the resource bundle and execute the updated web code in the updated resources to allow the user to access the updated features of the hybrid application. Thus, mobile device 210 can update the hybrid application while the hybrid application is running and without modifying the native software of the hybrid application.

Figure 8:
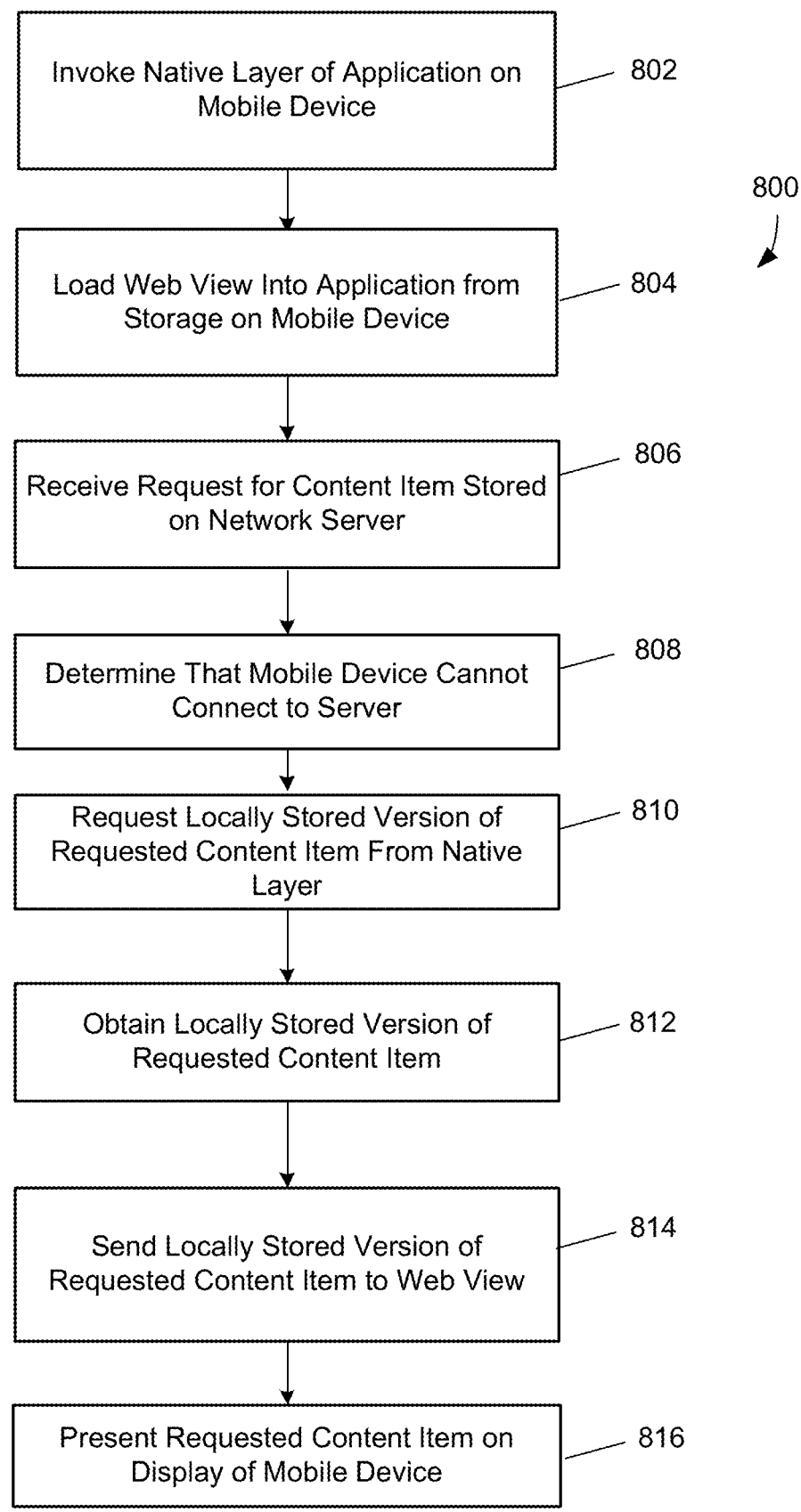
FIG. 8 is an example process for providing access to a hybrid application offline.

FIG. 8 is an example process 800 for providing access to a hybrid application offline. For example, by storing the web code, resources, and/or content items locally on mobile device 210, a hybrid application that typically depends on obtaining the web code, resources, and/or content items from a network resource can be executed by mobile device 210 even when mobile device 210 is not connected to a network.

At step 802, mobile device 210 can invoke a native layer of the hybrid application on the mobile device. For example, the native layer can correspond to native layer 214, described above. The native layer can include platform-specific software in that the software can be compiled and/or built for a specific operating system, processor, or system configuration used or implemented by mobile device 210.

At step 804, mobile device 210 can load a web view into the application from storage on mobile device 210. For example, the web view can correspond to web view 216, described above. The web view can include a web engine implemented using native software in native layer 214 and web code that is executed by the web engine to provide functionality, features, etc., to the hybrid application. The web code can be loaded into the web engine from a local resource bundle so that the hybrid application can function even when mobile device 210 is not connected to a network or corresponding network server.

At step 806, mobile device 210 can receive a request for a content item stored on a network server. For example, the hybrid application can receive user input requesting to view or edit a content item stored on the network server. The native layer of the hybrid application can request that the web view download content items from the network server to update the content items stored locally on mobile device 210, as described above.

At step 808, mobile device 210 can determine that the mobile device cannot connect to the network server. For example, the hybrid application (e.g., web view 216) can determine that mobile device 210 is not connected to a network and/or that the network server is unreachable.

At step 810, mobile device 210 can request a locally stored version of the requested content item from the native layer of the hybrid application. For example, in response to determining that the network server is unreachable, web view 216 can send a message to native layer 214 requesting the content item from local storage on mobile device 210.

At step 812, mobile device 210 can obtain a locally stored version of the requested content item. For example, native layer 214 can obtain the locally stored version of the requested content item from local content storage 220.

At step 814, mobile device 210 can send the locally stored version of the requested content item to web view 216. For example, native layer 214 can send the locally stored version of the requested content item to web view 216 through native bridge 302. Native layer 214 can, for example, encode the content item (e.g., content item identifier and contents) into a message string and send the message string to web view 216 using native bridge 302, as described above.

At step 816, mobile device 210 can present the requested content item on a display of mobile device 210. For example, after web view 216 receives the requested content item, web view 216 can present the content item on a graphical user interface generated according to the web code loaded from the local resource bundle on mobile device 210.

Figure 9A:
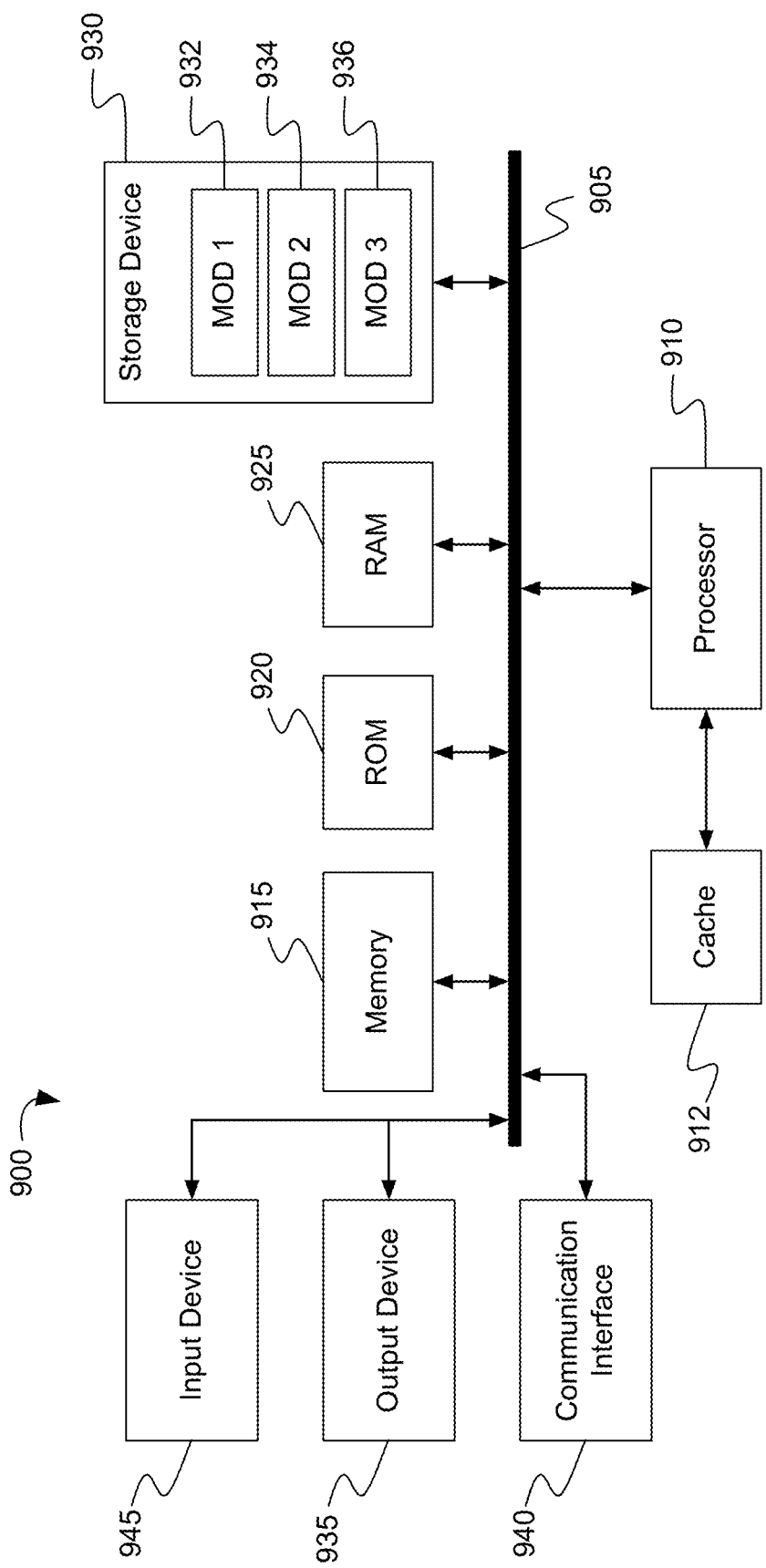
FIG. 9A shows an example possible system embodiment for implementing various embodiments of the present technology.
Figure 9B:
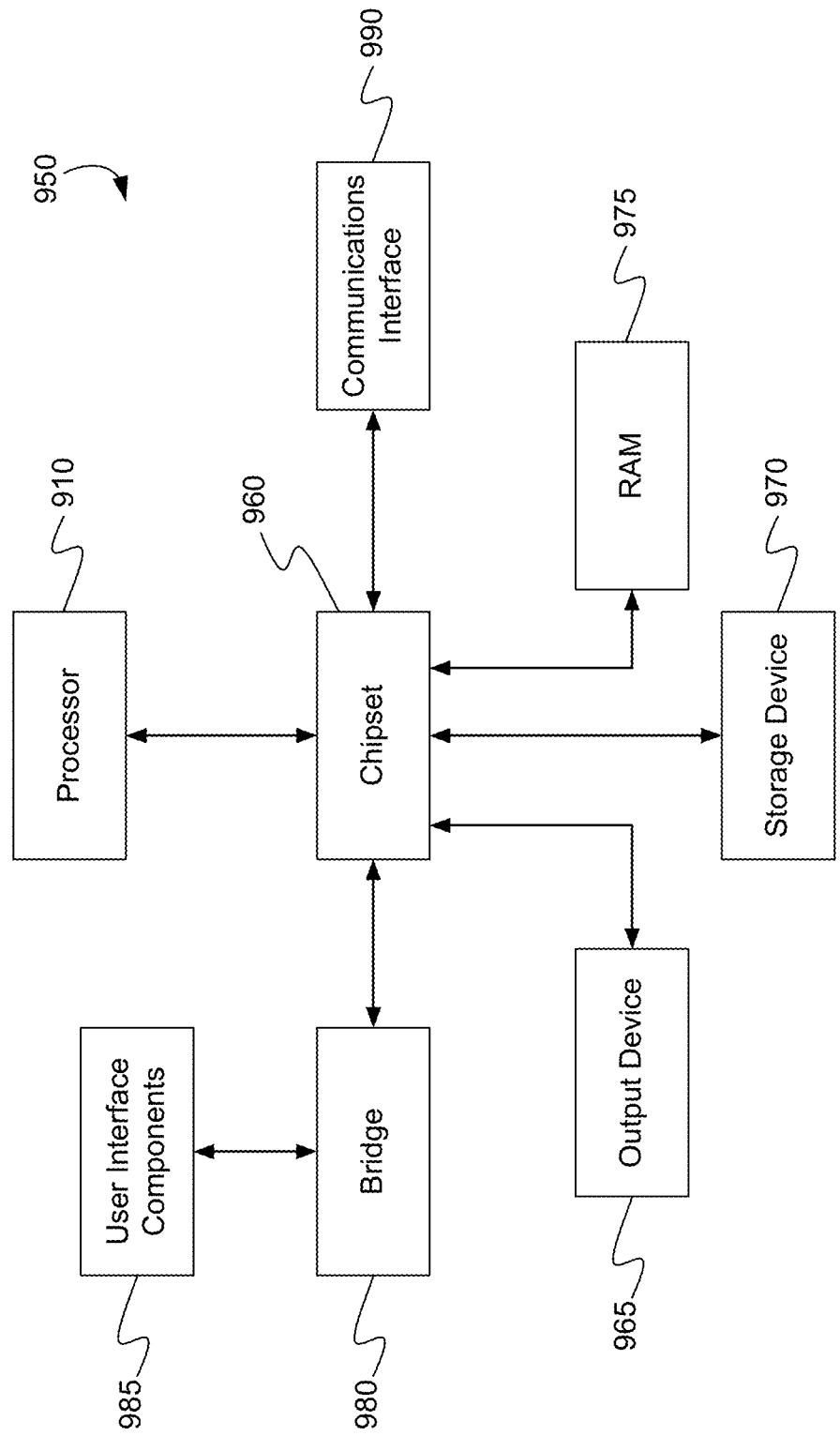
FIG. 9B shows an example possible system embodiment for implementing various embodiments of the present technology.

9A and FIG. 9B show example possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Example system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 910, representative of any number of physically and/or logically distinct resources capable of executing software, firmware, and hardware configured to perform identified computations. Processor 910 can communicate with a chipset 960 that can control input to and output from processor 910. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 910 analyzing data stored in storage 970 or 975. Further, the machine can receive inputs from a user via user interface components 985 and execute appropriate functions, such as browsing functions by interpreting these inputs using processor 910.

It can be appreciated that example systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
    executing, by a computing device, a software application comprising a native component for managing resources locally and a resource bundle having non-native web code defining a web view for the software application;
    upon executing the software application,
        loading, by the native component, the web view, and
        loading, by the web view, the resource bundle stored local to the computing device, the resource bundle comprising a native configuration file that identifies a current version of the software application installed on the computing device;
    receiving, by the web view, an updated native configuration file corresponding to an updated version of the software application;
    storing, by the native component, the updated native configuration file locally to the computing device;
    upon receiving the updated native configuration file, determining, by the web view, that a resource in the resource bundle should be updated, the determining comprising comparing the updated native configuration file to the native configuration file to determine which resources have changed; and
    based on the determining, requesting, by the web view, an updated resource corresponding to the resource that should be updated.

2. The method of claim 1, further comprising:
    obtaining, by the web view, the current version of the software application from the resource bundle.

3. The method of claim 2, further comprising:
    requesting, by the web view, version update information for the software application, the requesting comprising the current version of the software application installed on the computing device.

4. The method of claim 1, wherein comparing the updated native configuration file to the native configuration file to determine which resources have changed comprises:
    comparing a first timestamp of the resource in the native configuration file to a second timestamp of the resource in the updated native configuration file.

5. The method of claim 1, wherein comparing the updated native configuration file to the native configuration file to determine which resources have changed comprises:
    identifying that the resource does not exist in the native configuration file.

6. A non-transitory computer readable medium comprising one or more sequences of instructions, which, when executed by one or more processors, causes a computing system to perform operations comprising:
    executing, by the computing system, a software application comprising a native component for managing resources locally and a resource bundle having non-native web code defining a web view for the software application;
    upon executing the software application,
        loading, by the native component, the web view, and
        loading, by the web view, the resource bundle stored local to the computing system, the resource bundle comprising a native configuration file that identifies a current version of the software application installed on the computing system;
    receiving, by the web view, an updated native configuration file corresponding to an updated version of the software application;
    causing, by the web view, the updated native configuration file to be stored locally to the computing system;
    upon receiving the updated native configuration file, determining, by the web view, that a resource in the resource bundle should be updated, the determining comprising comparing the updated native configuration file to the native configuration file to determine which resources have changed; and
    based on the determining, requesting, by the web view, an updated resource corresponding to the resource that should be updated.

7. The non-transitory computer readable medium of claim 6, further comprising:
    obtaining, by the web view, the current version of the software application from the resource bundle.

8. The non-transitory computer readable medium of claim 7, further comprising:
    requesting, by the web view, version update information for the software application, the requesting comprising the current version of the software application installed on the computing system.

9. The non-transitory computer readable medium of claim 6, wherein comparing the updated native configuration file to the native configuration file to determine which resources have changed comprises:
    comparing a first timestamp of the resource in the native configuration file to a second timestamp of the resource in the updated native configuration file.

10. The non-transitory computer readable medium of claim 6, wherein comparing the updated native configuration file to the native configuration file to determine which resources have changed comprises:

identifying that the resource does not exist in the native configuration file.

11. A system comprising:
one or more processors; and
a memory having programming instructions stored thereon, which, when executed by the one or more processors, causes the system to perform operations comprising:
  executing, by the system, a software application comprising a native component for managing resources locally and a resource bundle having non-native web code defining a web view for the software application;
  upon executing the software application,
    loading, by the native component, the web view, and
    loading, by the web view, the resource bundle stored local to the system, the resource bundle comprising a native configuration file that identifies a current version of the software application installed on the system;
  receiving, by the web view, an updated native configuration file corresponding to an updated version of the software application;
  causing, by the web view, the updated native configuration file to be stored locally to the system;
  upon receiving the updated native configuration file, determining, by the web view, that a resource in the resource bundle should be updated, the determining comprising:
    comparing the updated native configuration file to the native configuration file to determine which resources have changed; and based on the determining, requesting, by the web view, an updated resource corresponding to the resource that should be updated.

12. The system of claim 11, wherein comparing the updated native configuration file to the native configuration file to determine which resources have changed comprises:
  comparing a first timestamp of the resource in the native configuration file to a second timestamp of the resource in the updated native configuration file.

13. The system of claim 11, wherein comparing the updated native configuration file to the native configuration file to determine which resources have changed comprises:
  identifying that the resource does not exist in the native configuration file.

* * * * *